M. HAYS.
Nut-Locks.
No. 137,919.  Patented April 15, 1873.
Fig. 1.
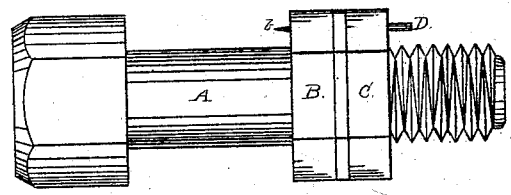
Fig. 2.  Fig. 3.
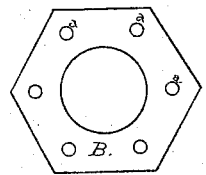 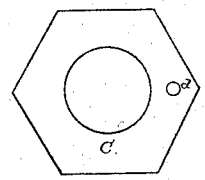
Fig. 5.  Fig. 4.
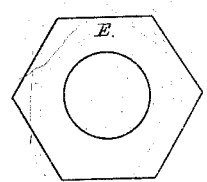 
WITNESSES  INVENTOR
H. C. Merrick  Matthew Hays

UNITED STATES PATENT OFFICE.

MATHEW HAYS, OF BINGHAMTON, NEW YORK.

IMPROVEMENT IN NUT-LOCKS.

Specification forming part of Letters Patent No. 137,919, dated April 15, 1873; application filed March 17, 1873.

*To all whom it may concern:*

Be it known that I, MATHEW HAYS, of Binghamton, in the county of Broome and State of New York, have invented certain Improvements in the Mode of Securing Screw-Nuts to Bolts, of which the following is a specification:

My invention relates to the combination of two right and left handed nuts, and a corresponding double-threaded screw-bolt, in such a manner that when the inner nut shall be up to its bearing the outer or set nut shall prevent it from displacement, the object of the invention being to effectually secure the nut from getting loose, by a simple and convenient arrangement.

Figure 1 in the accompanying drawing is a view of a bolt and nuts embodying my invention. Fig. 2 is the inner or jam nut detached. Fig. 3 is the set-nut; Fig. 4, the key-pin. Fig. 5 is the rubber-washer.

A is the bolt with the nuts in position. This bolt has a right and left screw-thread. The right-hand thread is used for the inner or jam nut B, and is made coarser than that for the set-nut C, the thread for which is left-handed and cut over and across those for the right-hand nut B. This nut has holes $a\ a\ a$ for the reception of the key-pin D, which is pointed at the end $b$. The stem of this pin is made smaller at the point $c$, and is entered into the hole $a$ in the jam-nut by passing through a hole, $d$, in the set-nut. E is a rubber washer, which is placed between the nuts B and C.

When it is designed to place the bolt in position for use the stem is passed through the hole and the nut B screwed up to its bearing; the rubber washer E is then placed in position and the nut C turned up closely against it; and the hole $d$ being made to correspond with one of the holes $a$ in the nut B the pointed end of the key-pin D is entered and driven through the rubber washer E into the hole in the opposite nut. This pin fits loosely in the holes $a$ and $d$, and is securely held in place by the contraction of the rubber washer around the small part $c$ of the stem. This arrangement effectually prevents the jam-nut B from getting loose, as the slightest turn would cause a counteracting movement of the set-nut C. Owing to the fineness of the thread of the set-nut the pin-hole $d$ may be moved up to correspond with the hole $a$ in the jam-nut B, after having been screwed up to the required tightness.

I claim as my invention—

The combination and arrangement of the bolt A and the nuts B and C, rubber washer E, and key-pin D, substantially as herein described and shown, for the purpose set forth.

MATHEW HAYS.

Witnesses:
PERRY P. ROGERS,
J. C. ROBIE.